M. AUDIBERT.
LENS SYSTEM FOR COLOR PHOTOGRAPHY AND FOR PROJECTION.
APPLICATION FILED JULY 8, 1913.
1,124,253. Patented Jan. 12, 1915.
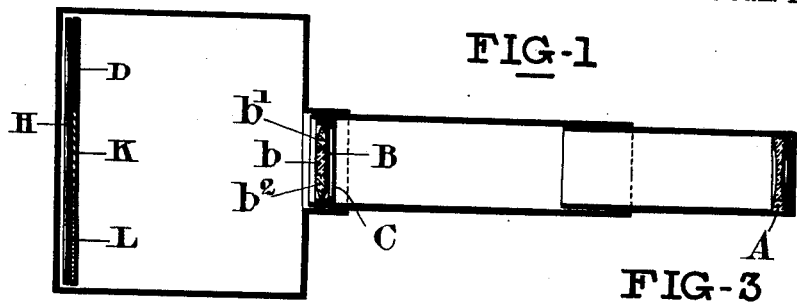
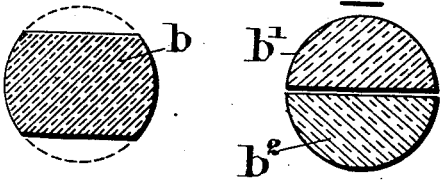
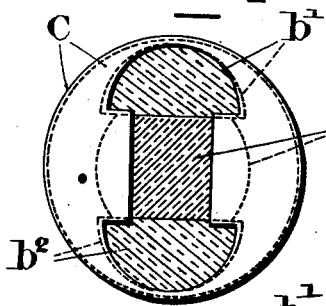
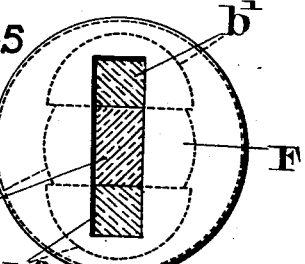
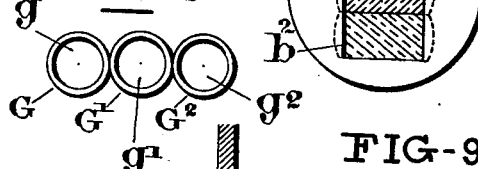
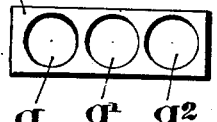
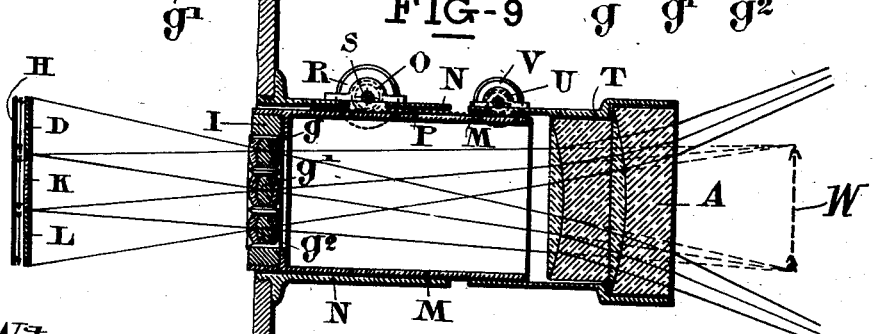
Witnesses:
Jean Germain
Guillaume Pioche
Inventor:
Maurice Audibert
By Edgar S. Brettell.
Attorney

UNITED STATES PATENT OFFICE.

MAURICE AUDIBERT, OF VILLEURBANNE, FRANCE.

LENS SYSTEM FOR COLOR PHOTOGRAPHY AND FOR PROJECTION.

1,124,253.  Specification of Letters Patent.  Patented Jan. 12, 1915.

Application filed July 8, 1913. Serial No. 777,905.

*To all whom it may concern:*

Be it known that I, MAURICE AUDIBERT, a citizen of the French Republic, residing at 7 Avenue Victor Hugo, Villeurbanne, in the Republic of France, have invented certain new and useful Improvements in Lens System for Color Photography and for Projection, of which the following is a specification.

The present invention relates to an improvement in the device for taking views for use in connection with fixed or kinematographic projections in colors described in the prior application for American patent in the names of Berthon and Audibert filed on October 28th 1911 under the Serial Number 657,235 and consists in the substitution for the concentric prismatic element serving to divide the picture produced by the front objective into three monochromes projected onto the sensitive layer, of another dividing element formed by lenses or portions of cut and juxtaposed lenses, whereby the luminosity of the apparatus is considerably increased.

The accompanying drawing shows by way of example various embodiments of the invention.

Figure 1 is a sectional diagrammatical view of an apparatus for taking views. Figs. 2 and 3 show the lenses from which the dividing elements of the second objective are cut. Fig. 4 shows the same objective mounted in its diaphragm. Fig. 5 shows a modification of the diaphragm with the dividing element. Fig. 6 shows another modification of the objective. Figs. 7 and 8 show two more embodiments of the invention in which juxtaposed complete lenses are used as dividing elements. Fig. 9 is a sectional view of an apparatus for taking views utilizing the dividing elements shown in Figs. 7 and 8.

A designates a front objective, diverging, intended to give a first image of the object which image is subsequently taken and divided by the rear objective B to which the invention more particularly relates.

In the embodiment shown in Figs. 1 to 5, this objective is constituted by three elements $b$, $b'$, $b^2$ cut from similar lenses (Figs. 2 and 3) in such a manner that one element is taken from the central zone of a first lens and the two others from the right and left of the central plane of a second similar lens. These three fragments are assembled on a diaphragm C cut as shown in Fig. 4.

The elements $b$, $b'$, $b^2$ may be painted with the fundamental colors so as to produce the selection of colors on the sensitive layer. However, it is preferable to use ordinary glasses and place in contact with the sensitive layer H, a selector screen having a red portion D, a green portion K and a blue portion L.

For the projection, it is preferable to use an objective E similar to the objective for taking views but the diaphragm F would leave a more reduced window or aperture for the passage of the luminous rays, as illustrated in Fig. 5.

In the embodiment shown in Fig. 6, the three parts of the dividing element are taken exclusively in the central part $b$ of three similar and juxtaposed lenses in the manner already described.

In the modification shown in Fig. 7, the dividing element is constituted by three lenses $g$, $g'$, $g^2$ mounted in juxtaposed tubes G, G' and G². These tubes may be replaced by three holes formed in a rectangular block I and centered exactly on the same line, as shown in Fig. 8. The mounting and adjustment of the lenses are thus considerably simplified.

In order to facilitate the adjustment, the block I or the tubes which contain the dividing element $g$, $g'$ and $g^2$, are mounted in a tube M movable within a sleeve N fixed to the casing of the apparatus and susceptible of being moved by means of a pinion O meshing with a rack P. A milled head R fixed on the spindle S of the pinion O enables a forward or backward movement of the tube M to take place. Similarly the front objective A is mounted in a tube T movable on the tube M and actuated by a milled head V controlling a pinion U meshing with the rack P.

The invention is designed to operate as follows referring to Fig. 9 of the drawing. The coplanar views shown at H, located behind their respective color screens D., K. and L. are projected by the lenses $g$, $g^1$ $g^2$ in such a manner that, were their rays not subsequently diverted by the lens A, a common image of the three coplanar views would be formed at the position designated by W. The lens A is placed as shown between the lenses $g$, $g^1$, $g^2$ and the point W, in such a way that its distance from W is conjugate to its distance from the screen. The common image W, thus becomes the virtual object and is projected through the lens A to form a real image on the screen. N. B. Assuming distances to refer to the principal points of lenses.

For taking views for projection in color, the invention is designed to operate as follows: The lens A forms a virtual image W of the object to be taken, as shown in Fig. 9 of the drawing. The lenses $g$, $g^1$ and $g^2$ project the virtual image W as shown through their respective color screens D, K and L, in such a way as to form separate monochrome images of the object taken, on the sensitized surface H.

What I claim and desire to secure by Letters Patent of the United States is:—

1. A lens system comprising a negative lens and a means for forming a plurality of monochrome images.

2. A lens system comprising a negative front lens and a plurality of positive monochrome image forming means arranged in the rear thereof and adjacent to one another.

3. A lens system comprising a negative front lens and a plurality of positive monochrome coplanar image forming means arranged in the rear thereof and adjacent to one another.

4. A lens system comprising a negative front lens and a plurality of monochrome coplanar image forming means, having parallel axes arranged in the rear thereof and adjacent to one another.

5. A lens system comprising a negative lens for forming a virtual image, and a plurality of positive lenses and their respective color screens for forming monochrome coplanar images of said virtual image.

6. A lens system, comprising a plurality of colored objectives for projecting a corresponding number of coplanar views as monochrome images to form a comon virtual object, and a negative lens through which a real image of said virtual object is formed.

In testimony whereof I affix my signature in presence of two witnesses.

MAURICE AUDIBERT.

Witnesses:
JEAN GERMAIN,
MARIUS HEMAZ.